United States Patent [19]
Anderson et al.

[11] Patent Number: 5,444,317
[45] Date of Patent: Aug. 22, 1995

[54] BRAKING MECHANISM FOR A SHADED-POLE MOTOR

[75] Inventors: Leon J. Anderson, Poplar Grove; Scott R. Larkin, Rockton; Jeffrey D. Reisetter, Machesney Park; Dennis H. Walters, Rockford, all of Ill.

[73] Assignee: Barber-Colman Company, Rockford, Ill.

[21] Appl. No.: 151,928

[22] Filed: Nov. 15, 1993

[51] Int. Cl.⁶ .................. H02K 7/102; H02K 49/00
[52] U.S. Cl. ................................ 310/77; 310/103
[58] Field of Search .................. 310/76, 77, 93, 94, 310/103, 42; 192/12 D, 17 C; 188/158, 161

[56] References Cited

U.S. PATENT DOCUMENTS

| | | | |
|---|---|---|---|
| 2,539,836 | 1/1951 | Hoffmann | 310/77 |
| 3,219,858 | 11/1965 | Ellis et al. | 310/77 |
| 3,344,292 | 9/1967 | Hurst | 310/76 |
| 3,379,907 | 4/1968 | Hollinger | 310/77 |
| 3,478,238 | 11/1969 | Herman et al. | 310/77 |
| 3,510,704 | 5/1970 | Shaffer | 310/77 |

FOREIGN PATENT DOCUMENTS

| | | | |
|---|---|---|---|
| 826010 | 7/1949 | Germany | 310/77 |
| 2263475 | 7/1974 | Germany | 310/77 |
| 752328 | 7/1956 | United Kingdom | 310/77 |

OTHER PUBLICATIONS

Barber-Colman Company Drawings Nos. 3411-5639, dated Jan. 22, 1990.
Barber-Colman Company Drawings Nos. 3411-5655, dated Feb. 16, 1990.

*Primary Examiner*—Clayton E. LaBalle
*Attorney, Agent, or Firm*—Leydig, Voit & Mayer, Ltd.

[57] ABSTRACT

The rotor of a shaded-pole motor carries a braking ring with a radially projecting stop lug adapted to coact with a pivoted pawl to brake the rotor to a stop when the motor is de-energized. The pawl carries a pole piece which, upon energization of the motor, is magnetically attracted toward the stator thereof to cause the pawl to pivot to a released position clear of the stop lug. The braking mechanism requires relatively few components, and those components may be used universally either with a motor with a clockwise rotatable rotor or a motor in which the rotor rotates in a counterclockwise direction.

11 Claims, 4 Drawing Sheets

BRAKING MECHANISM FOR A SHADED-POLE MOTOR

BACKGROUND OF THE INVENTION

This invention relates to a shaded-pole motor and, more particularly, to a shaded-pole motor having a mechanical brake for stopping the rotor of the motor when the motor is de-energized.

For several years, the assignee of the present invention has sold shaded-pole motors with brakes for automatically stopping the rotor upon de-energization of the motor. The prior brake comprises a pivotally mounted pawl and a separately pivotally mounted pole piece. When the motor is energized, the pole piece is magnetically attracted to the laminated core of the stator of the motor and, upon being so attracted, swings about its pivot and forces the pawl to swing about its pivot to a released position in which the pawl clears a stop lug on the rotor so as to permit rotation of the rotor. Upon de-energization of the motor, a spring swings the pole piece reversely about its pivot so as to cause the pawl to swing reversely around its pivot to a braking position in which the pawl engages the stop lug on the rotor in order to apply a braking force to the rotor.

The prior brake requires several components and thus is relatively expensive to manufacture and assemble. Moreover, the prior brake requires one set of components if the rotor is rotated in a clockwise direction and a different set of components if the rotor is rotated in a counterclockwise direction. Accordingly, tooling costs and inventory requirements are comparatively high.

SUMMARY OF THE INVENTION

The general aim of the present invention is to provide a new and improved shaded-pole motor brake which, when compared to prior brakes of the same general type, may be manufactured and assembled on a more economical basis.

A related object of the invention is to provide a brake whose components may be used universally with motors having rotors which rotate either clockwise or counterclockwise.

A more detailed object is to achieve the foregoing by providing a brake in which the pawl and the pole piece are essentially a single unit mounted to swing about a single pivot and in which the unit may be reversed for mounting on either side of the rotor depending upon the direction of rotation of the rotor.

The invention also resides in the provision of a pole piece which reduces shunting of magnetic flux from the rotor when the pole piece is attracted to the laminated stator core.

These and other objects and advantages of the invention will become more apparent from the following detailed description when taken in conjunction with the accompanying drawings.

Figure 1:
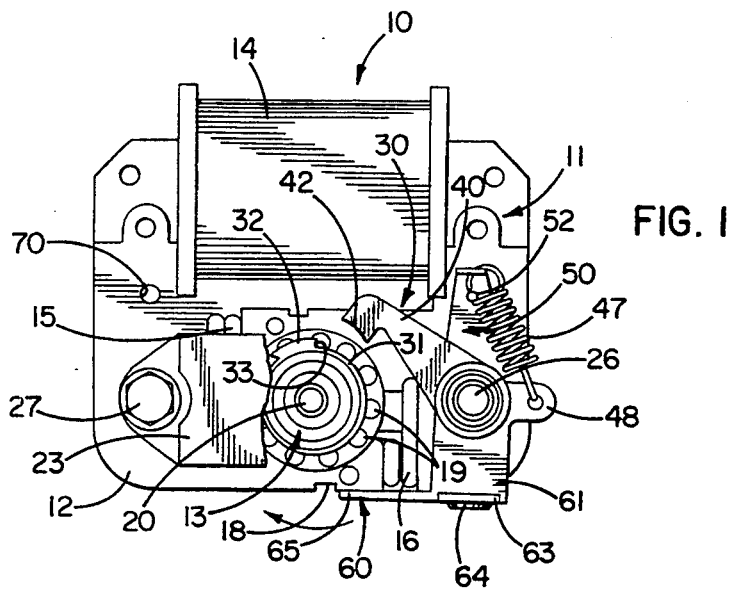
FIG. 1 is a front elevational view of a typical shaded-pole motor with a clockwise rotatable rotor and equipped with a new and improved brake incorporating the unique features of the present invention, certain parts of the motor being broken away and the brake being shown in a released position.
Figure 2:
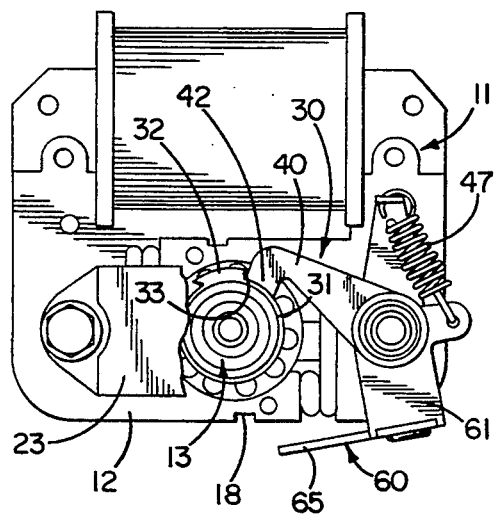
FIG. 2 is a view similar to FIG. 1 but shows the brake in an active braking position.
Figure 3:
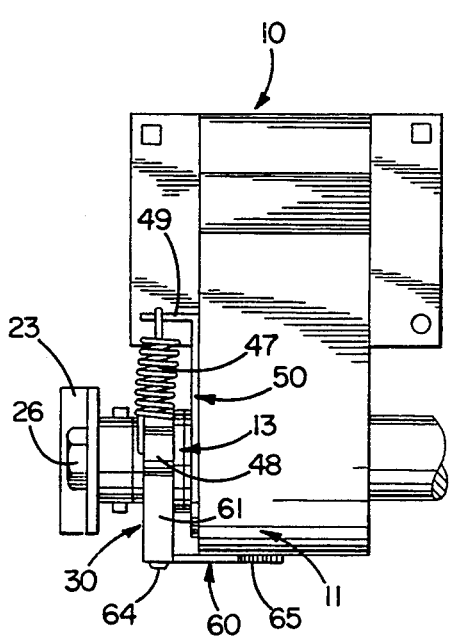
FIG. 3 is a fragmentary side elevational view of the motor shown in FIG. 1.

While the invention is susceptible of various modifications and alternative constructions, a certain illustrated embodiment hereof has been shown in the drawings and will be described below in detail. It should be understood, however, that there is no intention to limit the invention to the specific form disclosed, but on the contrary, the intention is to cover all modifications, alternative constructions and equivalents falling within the spirit and scope of the invention.

DETAILED DESCRIPTION OF THE PREFERRED EMBODIMENT

For purposes of illustration, the invention has been shown in the drawings in connection with a shaded-pole electric motor 10 which, in and of itself, is basically of conventional construction. The motor includes a stator 11 with a generally rectangular laminated core 12, a rotor 13 rotatable in a cylindrical recess in the core, and a field coil 14 mounted on one leg of the core and adapted to be energized by a.c. voltage to produce magnetic flux creating a magnetic field in the core. In addition, two sets of shading rings or coils 15 and 16 are supported by the core 12 on the pole thereof to shade or suppress a component of the field in order to cause the latter to revolve around the rotor and produce starting torque. The coils 15 and 16 are short-circuited and cause the rotor of the motor of FIGS. 1–5 to rotate in a clockwise direction by virtue of the field moving from the main pole area to the shaded area. The core 12 is notched as indicated at 18 in FIG. 1 to reduce the lamination area in the vicinity of the notch and cause rapid saturation to force the majority of the flux through the rotor.

In this specific instance, the rotor 13 comprises a cylindrical core carrying a plurality of conducting bars 19 that are fitted in peripheral slots equally spaced around the core and are connected by conducting discs at their ends. The rotor includes a central shaft 20 which is tightly received with a press fit or by adhesive bonding in a tubular hub 21 (FIG. 5) having a flange 22 at the outer end thereof. The shaft extends through the hub and is journaled in a bearing bracket 23 having two apertured ears 24 and 25 at its ends. Screws 26 and 27 extend through the ears and through holes 28 (FIG. 4) formed in the stator 11 and are threaded into a rear bearing bracket (not shown), thereby fastening the bearing bracket 23 to the stator.

Upon de-energization of the field coil 14, the rotor tends to coast to a stop. In many applications, however, there is a need to brake the rotor to a stop when the field coil is de-energized. Thus, the motor 10 is equipped with a braking mechanism 30.

The present invention contemplates a new and improved braking mechanism 30 which includes a relatively small number of components so as to enable economical manufacture and assembly of the braking mechanism. Moreover, the components of the braking mechanism are constructed such that the same mechanism may be used either with a motor with a clockwise rotatable rotor 13 or with a motor in which the rotor rotates in a counterclockwise direction.

More specifically, the braking mechanism 30 includes a braking member 31 (FIG. 5) which herein is in the form of a hard plastic ring telescoped rotatably over the hub 21. Formed integrally with and projecting radially from the ring 31 is a stop lug 32 formed with an angled stop surface 33 which faces in a circumferential direction. The rotor 13 of the motor 10 shown in FIGS. 1–5 rotates in a clockwise direction and, in that motor, the stop surface 33 also faces in a clockwise direction.

Two resiliently yieldable wave washers 34 (FIG. 5) are telescoped onto the hub 21 adjacent the inner end of the braking ring 31 and are sandwiched between the braking ring and a plain washer 35 which is fixed to the inner end portion of the hub by swaging the inner end of the hub. The wave washers press the ring 31 against a plain washer 36 which, in turn, is pressed against the flange 22 of the hub. Accordingly, the braking ring is frictionally coupled to the hub so as to normally rotate in unison with the hub. When the stop surface 33 of the stop lug 32 is engaged and stopped, the ring slips relative to the hub but friction created between the ring, the washers and the flange causes the rotor 13 to stop without imposing abrupt shock loads on the rotor.

Figure 4:
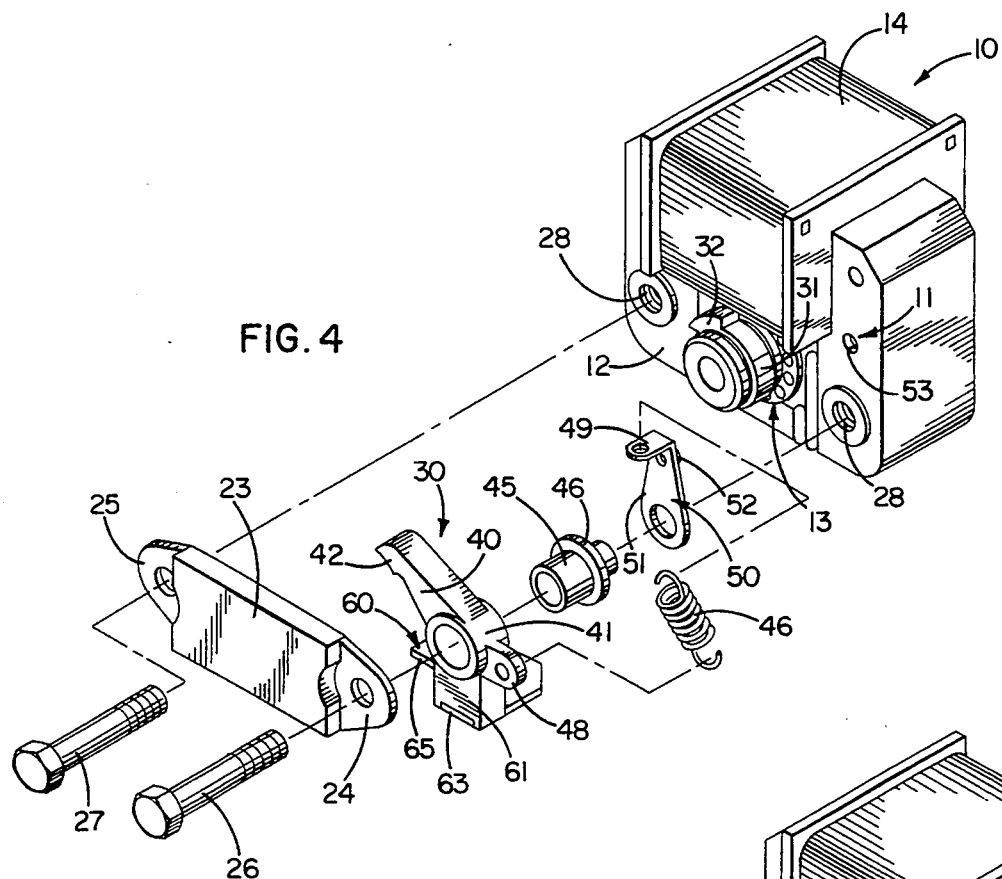
FIG. 4 is an exploded perspective view of certain components of the motor.
Figure 5:
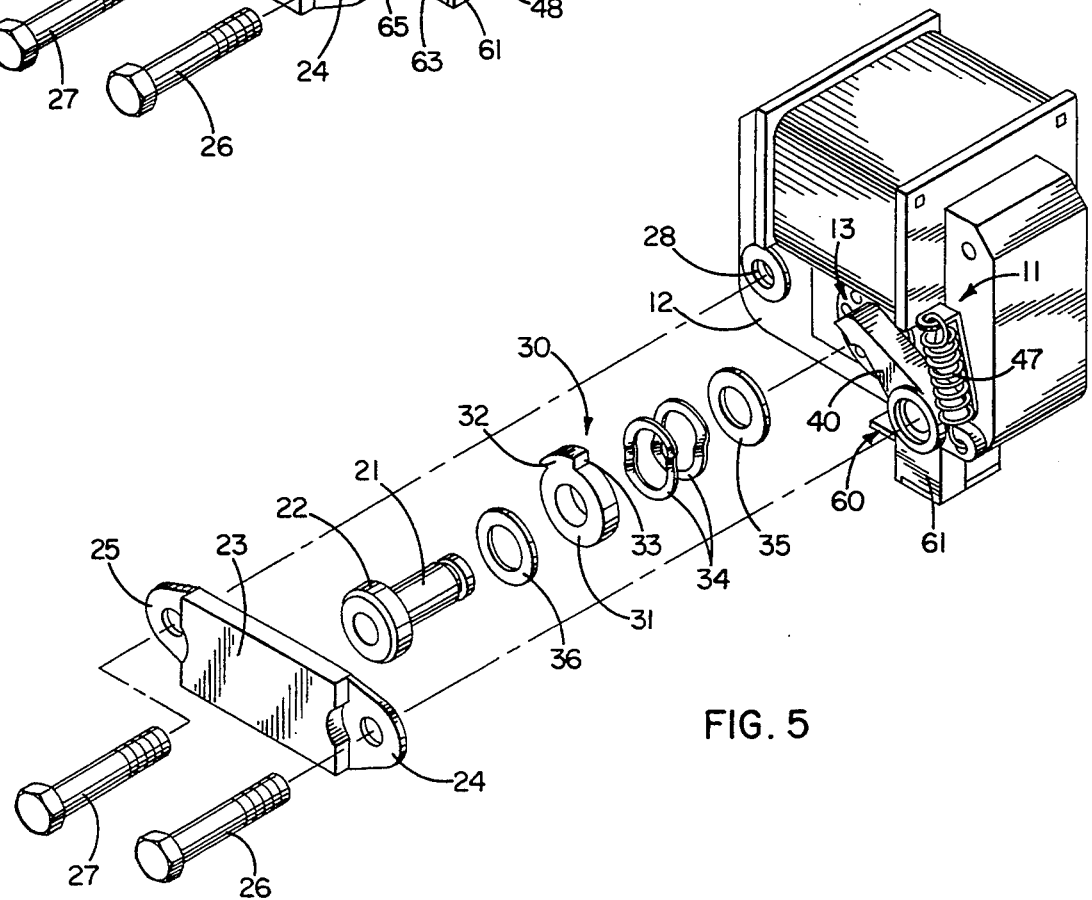
FIG. 5 is an exploded perspective view of certain other components of the motor.

Provision is made of a pawl 40 for selectively engaging the stop surface 33 of the lug 32 in order to stop the rotor 13. Herein, the pawl is injection molded from a relatively hard plastic material and is formed integrally with and projects radially from a central tubular hub 41 (FIG. 4). The pawl is pivotally mounted on the stator 11 and, when the pawl is in an active braking position shown in FIG. 2, a tooth 42 on the pawl engages the stop surface 33 of the lug 32 to bring the rotor to a stop. The free end of the tooth is angled in accordance with the angle of the stop surface 33. In the motor 10 of FIGS. 1–5, the pawl is adapted to be pivoted clockwise from the braking position of FIG. 2 to a released position shown in FIG. 1. When the pawl is in the latter position, the tooth 42 clears the lug 32 to permit free rotation of the rotor.

In the motor 10 of FIGS. 1–5, the pawl 40 is mounted on the stator 11 on the right hand side of the rotor 13. For this purpose, a bushing 45 (FIG. 4) with a radially extending flange 46 is supported by the screw 26 and is telescoped rotatably into the hub 41, the latter being sandwiched between the ear 24 and the flange 46. A contractile spring 47 biases the pawl 40 counterclockwise about the bushing 45 to its active braking position. One end of the spring is hooked into an apertured ear 48 molded integrally with the hub 21 and spaced angularly from the pawl. The other end of the spring is hooked into an outwardly extending and apertured ear 49 of a spring retaining element 50 having an upright plate 51 supported on the bushing 45 and sandwiched between the stator 11 and the flange 46. An anti-rotation pin 52 extends rearwardly from the plate 51 and projects into a hole 53 in the stator 11 to prevent turning of the spring retaining element 50.

Pursuant to the invention, a pole piece 60 made of magnetic material is connected rigidly with the pawl 40 and coacts with the stator 11 to cause the pawl to swing to its released position when the field coil 14 is energized. In this instance, the pole piece is flat and generally L-shaped and is stamped from steel. Importantly, a mounting arm 61 is molded integrally with and projects radially from the hub 41 in angularly spaced relation with the pawl 40 and the ear 48. The lower end of the arm is formed with a recess which receives the short leg 63 of the pole piece 60. A plastic protrusion 64 (FIGS. 1 and 3) projects downwardly from the lower end of the arm and through a hole (not visible) in the short leg of the pole piece. The lower end of the protrusion is staked over against the underside of the pole piece and serves to clamp the latter against the lower end of the arm. Other means, however, may be used to fasten the pole piece to the arm.

The long leg 65 of the pole piece 60 underlies the core 12 of the stator 11. When the field coil 14 is deenergized, the spring 47 biases the pole piece to an inactive position (FIG. 2) in which the pole piece is spaced from the lower side of the core. Upon energization of the field coil, magnetic flux attracts the pole piece into engagement with the core as shown in FIG. 1. As a result of such attraction, the pawl 40 is pivoted clockwise to its released position of FIG. 1.

As shown in FIG. 1, the length of the long leg 65 of the pole pieces 60 is such that the free end of the long leg is located short of the notch 18 in the core 12 when the pole piece is in its active position. By virtue of the pole piece stopping short of the notch, magnetic shunting is reduced so as to create lower losses than otherwise is the case when a pole piece spans the notch.

To summarize, the spring 47 biases the one-piece unit consisting of the pawl 40, the hub 41, the ear 48 and the arm 61 in a counterclockwise direction when the field coil 14 is de-energized. Under such condition, the free end of the tooth 42 of the pawl engages the stop surface 33 of the lug 32 to prevent rotation of the rotor 13, the long leg 65 of the pole piece 60 being spaced below the core 12 of the stator 11. When the field coil is energized and magnetic flux attracts the pole piece into engagement with the core, the pawl is pivoted clockwise to a released position in which the pawl tooth 42 clears the lug 32 to permit free rotation of the rotor 13. Upon de-energization of the field coil and counterclockwise pivoting of the pawl, the pawl tooth engages the lug to stop rotation of the braking ring 31 and cause friction between the ring 31, the washers 34–36, the hub flange 22 to bring the rotor to a stop without shock loads. If the rotor should happen to bounce counterclockwise after the lug hits the pawl tooth, the clockwise facing edge of the pawl tooth engages the counterclockwise facing surface of the lug to limit counterclockwise bouncing to less than one revolution. The aforementioned edge and surface are formed at complementary angles.

From the foregoing, it will be apparent that the present invention brings to the art a braking mechanism 30 which is of relatively simple and inexpensive construction by virtue of the pawl 40, the hub 41 and the pole piece mounting arm 61 being formed as a single integral unit. This construction enables the braking mechanism to operate quieter (e.g., four db quieter) than prior braking mechanisms and enables the rotor to be stopped after one or two revolutions rather than two or more revolutions as is the case with prior mechanisms.

Figure 6:
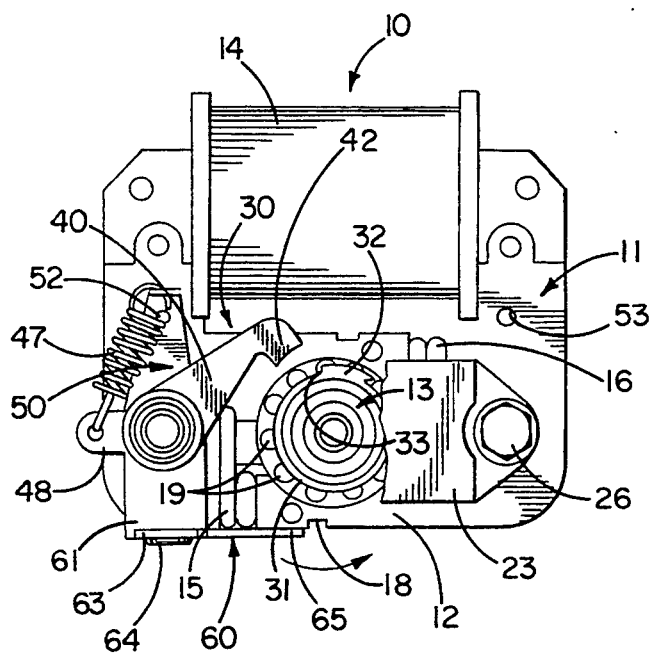
FIG. 6 is a view similar to FIG. 1 but shows a motor having a counterclockwise rotatable rotor and a brake for stopping rotation of that rotor.
Figure 7:
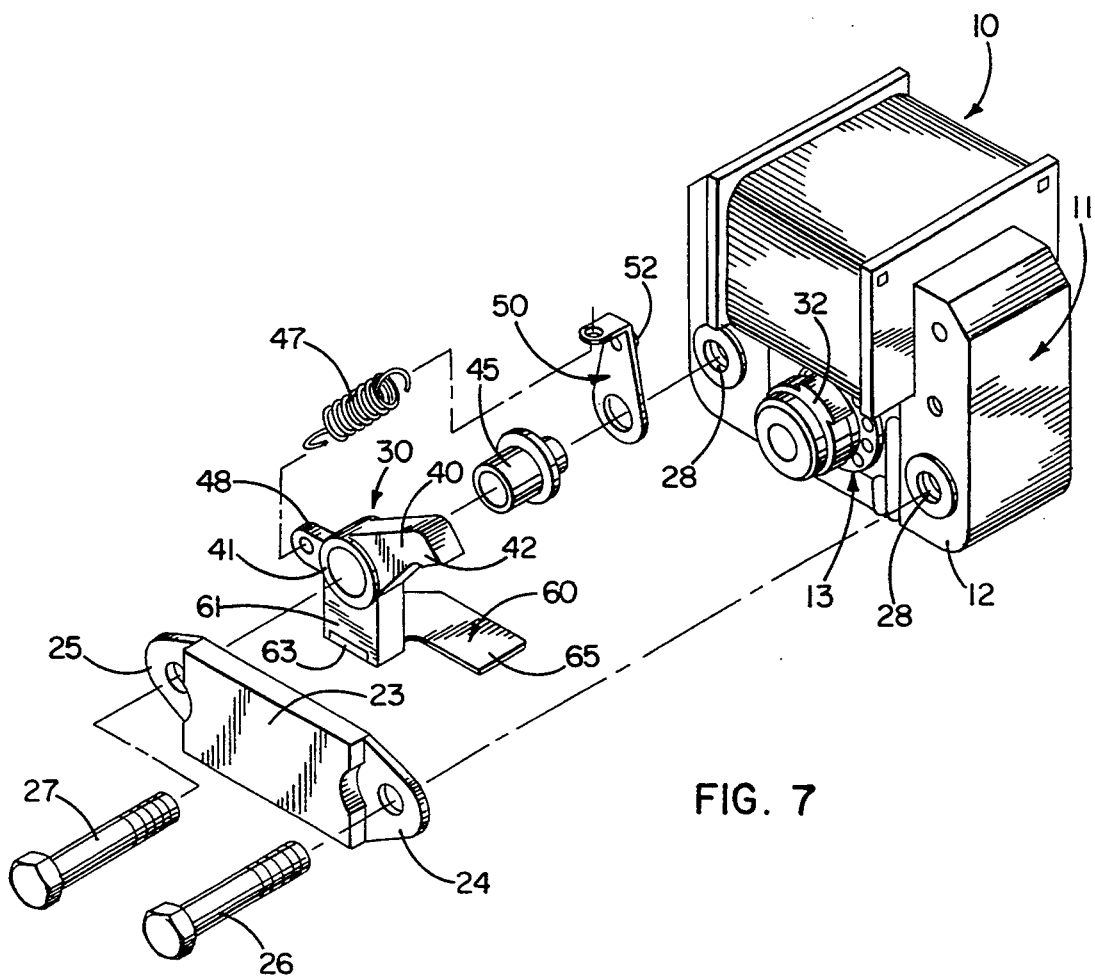
FIGS. 7 and 8 are views similar to FIGS. 4 and 5, respectively, but show the components of the motor and brake of FIG. 6.
Figure 8:
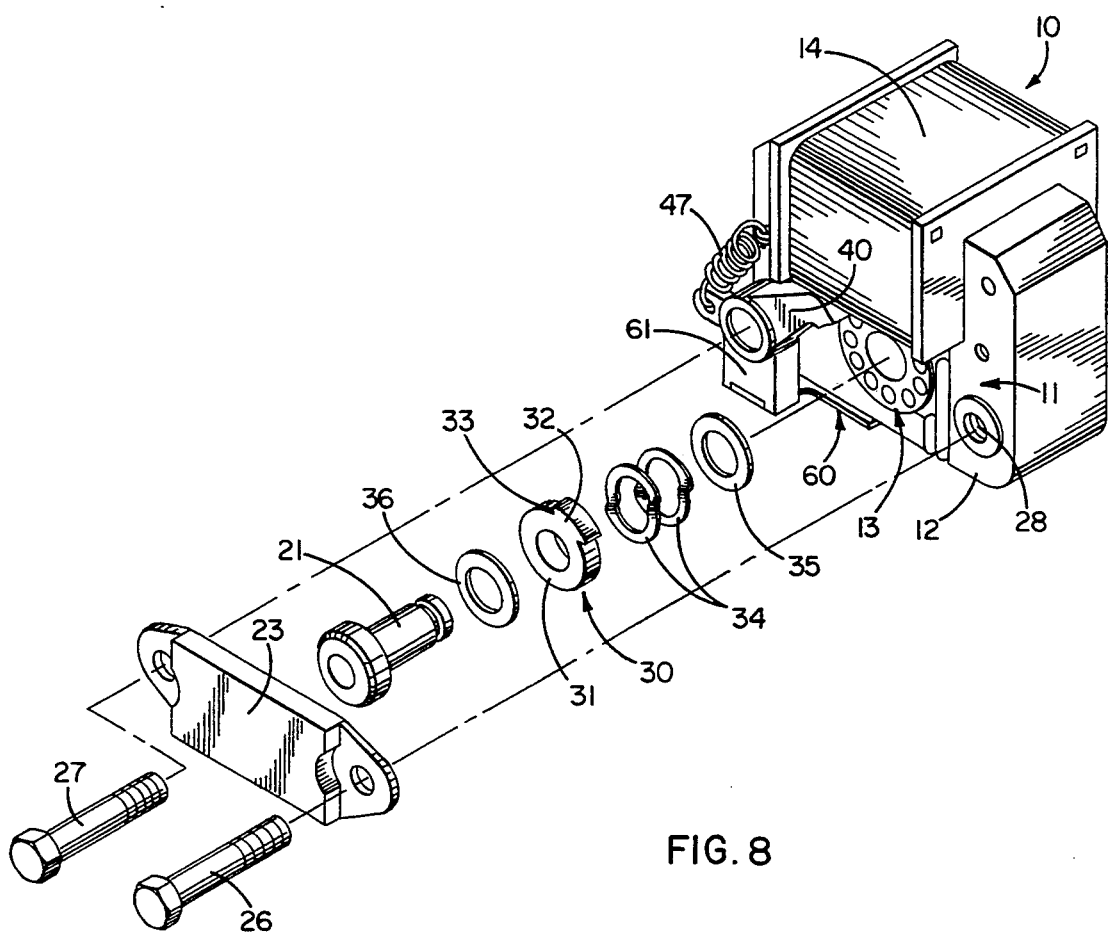

Importantly, the same braking mechanism 30 may be used universally with the motor 10 regardless of whether the rotor 13 is rotated in a clockwise direction or in a counterclockwise direction. FIGS. 6–8 show the braking mechanism installed on a motor having shading rings 15 and 16 which cause the rotor to rotate in a counterclockwise direction. As illustrated in FIG. 8, the braking ring 31 is turned end-for-end through 180 degrees on the hub 21 so that the angled stop surface 33 of the stop lug 32 faces in a counterclockwise direction. In addition, the one-piece unit consisting of the pawl 40, the hub 41, the ear 48 and the arm 61 is turned end-for-end through 180 degrees and, along with the spring 47 and the spring retaining element 50, is attached to the stator 11 on the left side of the rotor 13 by the screw 27 and by virtue of the anti-rotation pin 52 of the retaining element projecting into a hole 70 (FIG. 1) in the left side of the stator. It will be noted that the spring retaining element does not require any reorientation when switched from the right side of the stator to the left side thereof.

When the braking mechanism 30 is installed on the left side of the rotor 13, the pole piece 60 is both turned end-for-end and is inverted prior to being attached to the arm 61 by the protrusion 64. Thus, the long leg 65 of the pole piece 60 may remain positioned inwardly of the arm 61 but extends left-to-right from the arm rather than from right-to-left.

The key to the universal applicability of the components of the braking mechanism 30 resides in the fact that the unit consisting of the pawl 40, the hub 41, the ear 48 and the arm 61 is symmetrical with respect to a radial plane extending midway between the ends of the hub. Also, the braking ring 31 and the stop lug 32 are symmetrical with respect to such plane. Thus, the components may be turned end-for-end for either clockwise or counterclockwise rotation of the rotor 13 without affecting the positions of the components relative to one another and without adversely affecting the positions of the components relative to the other parts of the motor 10.

Because the components of the braking mechanism 30 may be used universally with motors 10 of either direction, the cost of tooling the components is reduced significantly when compared to "handed" braking mechanisms. Also, a fewer number of different components need be kept in inventory.

We claim:

1. A shaded-pole electric motor comprising a stator having a laminated core, a field coil and a shading coil and further comprising a rotor, said field coil being operable when energized to produce magnetic flux in said core and effect rotation of said rotor, and a brake freeing said rotor for rotation when said field coil is energized and acting to automatically stop said rotor when said field coil is de-energized, said brake comprising a member rotatable with said rotor and having a radially projecting lug with a circumferentially facing stop surface, a pawl having a tooth with a stop surface, a tubular mounting hub integral with said pawl and pivotally supporting said pawl on said stator to swing between a braking position in which said stop surface of said tooth engages the stop surface of said lug to stop said rotor and a released position in which said tooth clears said lug to permit rotation of said rotor, a spring connected between said pawl and said stator and urging said pawl toward said braking position, an arm integral with and projecting generally radially from said hub and spaced circumferentially from said pawl, a pole piece connected rigidly to and swingable in unison with said arm and spaced from said core when said pawl is in said braking position, said pole piece being magnetically attracted to said core when said field coil is energized and acting to overcome the force exerted by said spring on said pawl and cause said pawl to swing to said released position, said pawl, said arm and said hub constituting a single piece unit which is substantially symmetrical with respect to a radial plane extending through said hub midway between the ends thereof whereby said unit may be pivotally mounted on said stator in a left hand orientation adjacent one side of said rotor when said rotor is rotated in one direction and may be turned end-for-end through 180 degrees and pivotally mounted on said stator in a right hand orientation adjacent the opposite side of said rotor when said rotor is rotated in the opposite direction.

2. A motor as defined in claim 1 in which said stator includes means on opposite sides of said rotor for pivotally mounting said unit either in said left hand orientation or in said right hand orientation.

3. A motor as defined in claim 1 further including an ear formed integrally with and projecting radially from said hub and spaced circumferentially from said pawl and said arm, said spring having one end connected to said ear, said ear being substantially symmetrical with respect to said plane.

4. A motor as defined in claim 3 further including an element formed separately of said hub, said spring having an opposite end secured to said element, and said stator including means on opposite sides of said rotor for mounting said element in a fixed position on said stator adjacent said unit when said unit is either in said left hand orientation or is in said right hand orientation.

5. A motor as defined in claim 1 in which said member is substantially symmetrical with respect to said radial plane whereby said member may be positioned on said rotor with said stop surface of said lug facing clockwise when said rotor is rotated in a clockwise direction and may be turned end-for-end through 180 degrees and positioned on said rotor with said stop surface of said lug facing counterclockwise when said rotor is rotated in a counterclockwise direction.

6. A motor as defined in claim 1 in which said hub, said pawl and said arm are molded of plastic, said pole piece being made of metal, said arm having a plastic protrusion staked to said pole piece and securing said pole piece to said arm.

7. A motor as defined in claim 6 in which said pole piece is generally L-shaped and includes short and long legs attached to said arm and located adjacent said core, respectively.

8. A motor as defined in claim 1 in which a notch is formed in said core adjacent said rotor to force flux through said rotor, said pole piece having a free end which is located short of said notch when said pawl is in said released position.

9. A shaded-pole electric motor comprising a stator having a laminated core, a field coil and a shading coil and further comprising a rotor, said field coil being operable when energized to produce magnetic flux in said core and effect rotation of said rotor, and a brake freeing said rotor for rotation when said field coil is energized and acting to automatically stop said rotor when said field coil is de-energized, said brake comprising a member rotatable with said rotor and having a radially projecting lug with a circumferentially facing stop surface, a plastic pawl having a tooth with a stop surface, a tubular mounting hub molded integrally with said pawl and pivotally supporting said pawl on said stator to swing between a braking position in which said stop surface of said tooth engages the stop surface of said lug to stop said rotor and a released position in which said tooth clears said lug to permit rotation of said rotor, a spring connected between said pawl and said stator and urging said pawl toward said braking position, an arm molded integrally with and projecting generally radially from said hub and spaced circumferentially from said pawl, said arm having a plastic protrusion, a metal pole piece, said protrusion being staked to said pole piece and securing said pole piece to said arm whereby said pole piece is swingable in unison with said arm, said pole piece being spaced from said core when said pawl is in said braking position, and said pole piece being magnetically attracted to said core when said field coil is energized and acting to overcome the force exerted by said spring on said pawl and cause said pawl to swing to said released position.

10. A motor as defined in claim 9 in which said pole piece is generally L-shaped and includes short and long legs attached to said arm and located adjacent said core, respectively.

11. A motor as defined in claim 9 in which a notch is formed through said core adjacent said rotor to force flux through said rotor, said pole piece having a free end which is located short of said notch when said pawl is in said released position.

* * * * *